July 12, 1955 W. A. SNOOK 2,713,113
RETRACTABLE LAMP ASSEMBLY FOR AUTOMOBILES
Filed Sept. 12, 1952 2 Sheets-Sheet 1

INVENTOR.
Wayne A. Snook,
BY

McMorrow, Berman & Davidson
ATTORNEYS

July 12, 1955  W. A. SNOOK  2,713,113
RETRACTABLE LAMP ASSEMBLY FOR AUTOMOBILES
Filed Sept. 12, 1952  2 Sheets-Sheet 2
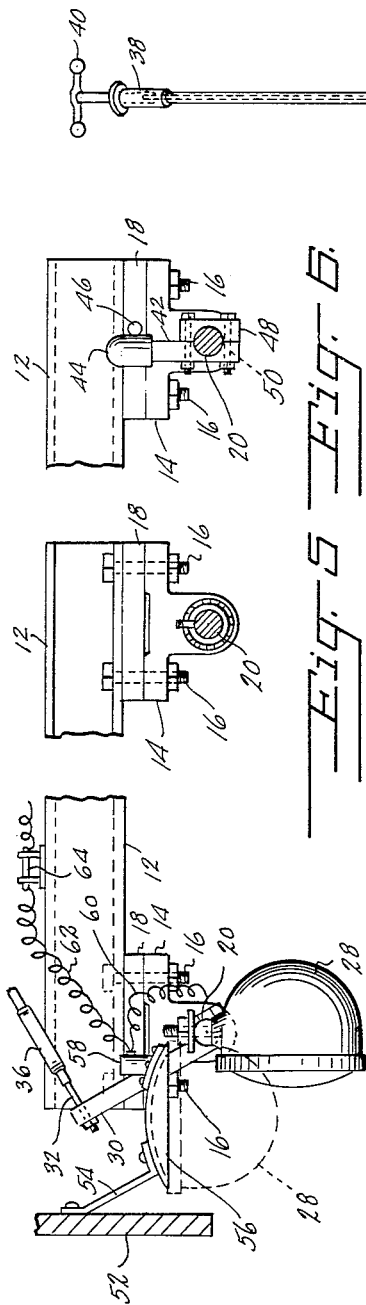
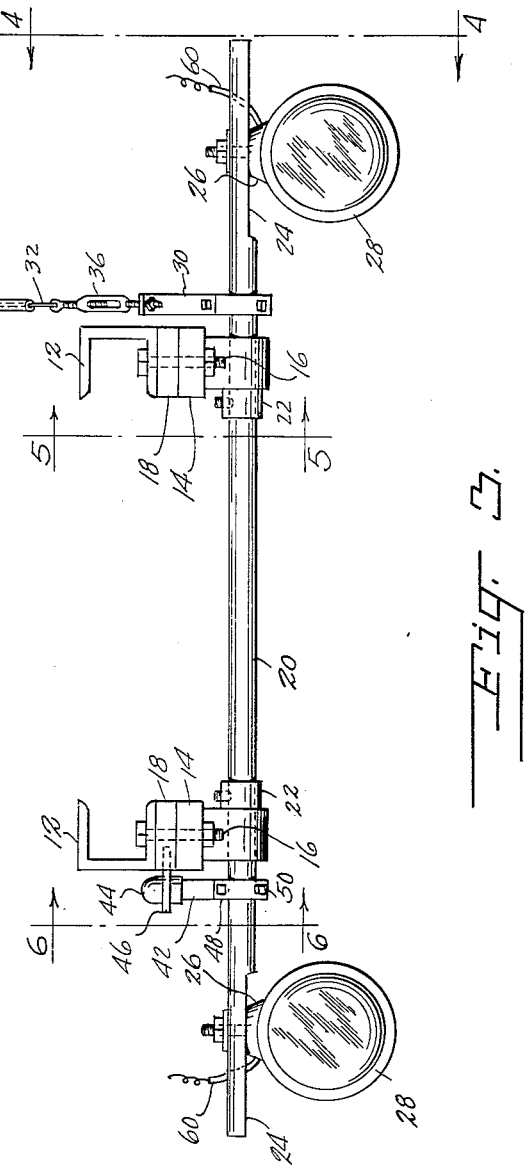
INVENTOR.
Wayne A. Snook,
BY
McMorrow, Berman + Davidson
ATTORNEYS

United States Patent Office 2,713,113
Patented July 12, 1955

2,713,113

RETRACTABLE LAMP ASSEMBLY FOR AUTOMOBILES

Wayne Aubury Snook, Ottumwa, Iowa

Application September 12, 1952, Serial No. 309,161

2 Claims. (Cl. 240—7.1)

This invention relates to a retractable lamp unit assembly for automobiles, and more particularly, has reference to a lamp assembly particularly adapted to provide a set of fog lights shiftable between selected inoperative and operative positions, under the control of the operator of the vehicle.

Conventional automobile fog lights are generally mounted at an elevation which causes the fog lights to project their beams directly into the fog, in an effort to penetrate the fog.

This arrangement, it has been found, is not entirely satisfactory, and it is considered that it is more desirable that the fog lights be mounted at a minimum distance above the road surface, so as, in effect, to reach out below the fog and light up the path along which the vehicle is moving.

However, when conventional fog light mounts are being used, it is difficult, if not impossible, to mount the fog lights at a desirably low elevation above the road surface, since fog lights mounted in a conventional manner at a low elevation above the road surface are particularly susceptible to damage. Such damage results, for example, in many instances when a vehicle is parked immediately in front of a vehicle on which the fog lights are mounted, since in these circumstances, a part of the parking vehicle may strike and damage the fog lights.

In view of the above, the broad object of the present invention is to provide a fog light assembly for automobiles which will be so mounted as to permit the fog lights to be retracted under ordinary circumstances, to locations at which they will be fully protected, the mounting which I have devised being such as to allow the fog lights to be extended to operative positions whenever it is necessary to use the same under fog conditions, the fog lights being disposed at a minimum elevation above a road surface when disposed in the operative positions thereof.

Another object of importance is to provide a fog light assembly of the character referred to in which the movement of the fog lights between their operative and inoperative positions can be readily controlled from within the vehicle, by the vehicle operator.

Still another object is to provide a fog light assembly as stated wherein means is utilized, that is effective to limit movement of the fog lights beyond their operative and inoperative positions, the means for limiting movement of the fog lights beyond their inoperative positions having embodied therein a circuit breaking means that automatically turns "off" the lights, said lights becoming automatically illuminated when dropped to their operative or extended locations.

Yet another object of importance is to provide a fog light assembly of the type stated which will be adapted for manufacture at relatively low cost, and will be so designed as to permit its being mounted upon any of various vehicles differing from one another as to the size and make thereof.

Yet another object is to provide a fog light assembly of the retractable type which can be mounted upon a vehicle in a minimum amount of time, will not require modification or redesigning of the vehicle, and will be rugged and substantially trouble free in operation.

Other objects will appear from the following description, the claims appended thereto, and from the annexed drawings, in which like reference characters designate like parts throughout the several views, and wherein:

Figure 3 is an enlarged front elevational view of the fog light assembly per se;

Figure 4 is an end elevational view of the fog light assembly, taken from the line 4—4 of Figure 3, the fog lights being illustrated in full lines in their operative position and in dotted lines in their inoperative position, part of the control means being broken away;

Figure 5 is a transverse sectional view taken on line 5—5 of Figure 3; and

Figure 6 is a transverse sectional view taken on line 6—6 of Figure 3.

Figure 1:
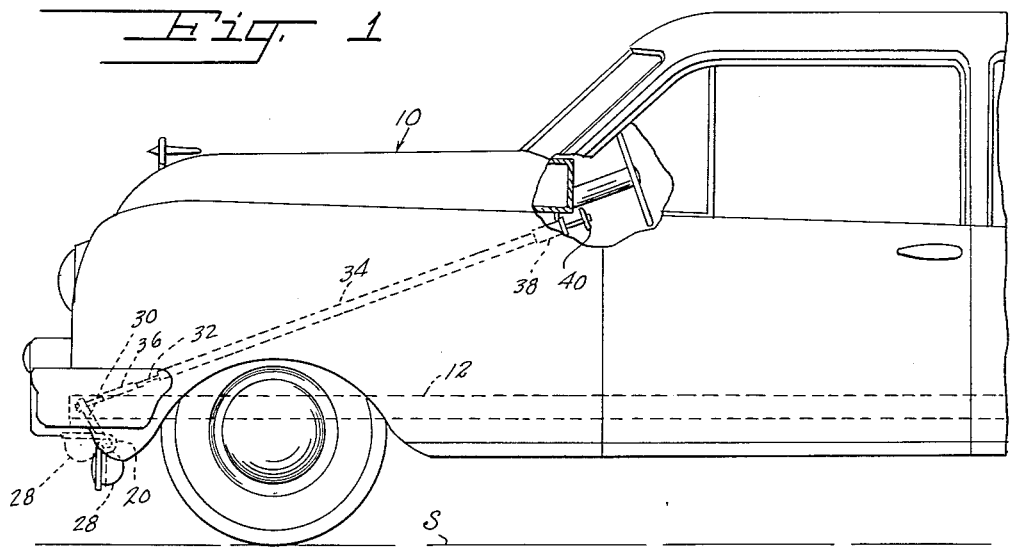
Figure 1 is a side elevational view of an automobile on which is mounted a fog light assembly formed in accordance with the present invention, portions of the vehicle being broken away, the fog light assembly being shown in full lines in its operative position and in dotted lines in its inoperative position.

The reference numeral 10 has been applied generally in the drawings, to designate a conventional automobile having longitudinal frame members 12.

The device constituting the present invention includes a pair of bearings 14, said bearings being connected to the respective frame members 12 by bolts 16. Should it be considered desirable or necessary, shims 18 can be interposed between the respective bearings and their associated frame members, said shims being formed with openings registering with the bolt receiving openings of the bearings.

The bearings can be any of various types, but it is preferred to use pillow block bearings of the type having a ball race capable of being secured by a set screw to a rock shaft 20 rotatably supported by the bearings.

The rock shaft 20 has been illustrated to particular advantage in Figure 3, and as will be noted, the rock shaft, while being freely rotatable within the bearings 14, is held against endwise movement by means of set collars 22 secured to the rock shaft at selected locations spaced longitudinally thereof, and engaging against the inner surfaces of the bearings 14.

The bearings 14 are spaced a substantial distance inwardly from the outer ends of the rock shaft, and said outer ends are formed, as shown in Figure 3, with flattened portions 24 against which are engaged flat surfaced projections 26 provided upon the lamp units 28.

The lamp units 28, when considered per se, are conventional fog light units, having the usual amber colored lenses.

Means is provided for rotating the rock shaft 20 in opposite directions, to shift the lamp units 28 between operative positions shown in full lines in Figure 4, and inoperative positions shown in dotted lines in this figure. In the operative positions of the lamp units, the lenses thereof will be disposed in substantially vertical planes, so as to cause the beams of the fog lights to be projected approximately horizontally, in front of the vehicle 10. In the inoperative positions of the lamp units, the lenses are disposed in substantially horizontal planes, the lamp units being retracted within the body of the vehicle in their inoperative positions, and being raised above a road surface to a far greater extent than they are when in their operative positions.

The means for controlling the rotatable movement of the rock shaft 20 includes a crank arm 30 clamped to the rock shaft 20 for rotation therewith, at a selected location taken longitudinally of the rock shaft. The crank arm is connected, at its outer end, to one end of a flexible steel cable 32, said cable being provided, intermediate its ends, with a turn buckle 36 that provides means for adjusting the tension of the cable.

The cable 32 is extended within and is slidable in opposite directions within, an elongated cable housing 34 of flexible construction, said cable housing 34 extending to the interior of the vehicle as shown in Figure 1, and terminating in a sleeve 38. The sleeve 38 is provided with a suitable mounting bracket, whereby said sleeve can be fixedly attached to the instrument panel of the vehicle.

That end of the cable 32 projecting through the sleeve 38 is provided with a handle 40, which can be grasped by a vehicle operator for the purpose of imparting a push-pull movement to the cable. It will be understood that when the handle 40 is shifted in the direction of its associated sleeve 38, the cable 32 will be operative to swing the crank arm 30 in a counter-clockwise direction, viewing the crank arm as it appears in Figure 1. Conversely, pulling movement imparted to the handle 40 and cable 32 is operative to swing the crank arm 30 in a clockwise direction. When the crank arm 30 swings in a clockwise direction, it imparts a corresponding rotatable movement to the rock shaft 20, swinging the fog lamp units 28 to their inoperative, retracted positions. Movement of the crank arm 30 in an opposite direction causes the fog lamp units to be dropped to their operative positions.

It is believed within the spirit of the invention to provide, in the sleeve 38, suitable latch means which will engage the cable 32 at the opposite extreme positions of its movement. Such a latch means could, in this connection, be of a type which would be releasable by rotatable movement of the handle 40, preliminary to movement of said handle toward or away from the sleeve 38. An arrangement of this type is believed well within the skill of those employed in the art, and accordingly, is not specifically illustrated in the drawing.

Stop means is embodied in the invention, that will limit movement of the lamp units beyond their operative positions. Said means has been illustrated to particular advantage in Figures 3 and 6, and includes a radial arm 42 recessed adjacent one end to receive the rock shaft 20. At its outer end, the radial arm 42 has a rubber cap 44 engageable against a laterally projected stop pin 46 mounted, in the present instance, upon one of the shims 18, that constitute parts of the rock shaft support bearings. The stop pin 46 could, in many instances, be eliminated entirely, so as to permit the radial arm 42 to engage, instead, a structural part of the vehicle itself.

In any event, the radial arm 42 is clamped in a selected position upon the rock shaft 20, by means of a clamping block 48, suitable bolts or equivalent fastening elements 50 extending through registering openings in the clamping block and radial arm to secure the clamping block and radial arm to the rock shaft 20 for rotation therewith.

Obviously, the radial arm 42 can be mounted upon the rock shaft 20 at any location taken longitudinally of the rock shaft, and further, before the radial arm is fixedly connected to the rock shaft, said arm can be adjusted about the axis of the rock shaft, to any extent found desirable or necessary.

Means is also embodied in the invention for limiting movement of the fog lamp units beyond their inoperative positions, said last-named means being illustrated to particular advantage in Figure 4. A structural member 52 of the vehicle, such as the bumper thereof, has fixedly secured thereto the upper end of an inclined bracket 54. The bracket 54 is riveted or otherwise fixedly attached, at its lower end, to a concavo convex lens shield 56. The lens shields 56, in this connection, are disposed adjacent opposite ends of the rock shaft 20, in the path of swinging movement of the fog lamp units, and are formed complementarily to the lenses of said units.

As a result, when the units 28 are swung upwardly to their inoperative positions, the lens shields 56 will completely overlie, and protectively enclose the lenses of the fog lamp units.

Carried by one or both lens shields 56 is a switch 58, said switch being so designed as to open an electrical circuit when engaged by the lens of the lamp unit, during movement of the lamp unit to its inoperative position. A lead 60 extends from the lamp units to the switches 58, leads 62 extending from the switches to a source of electrical power, such as the vehicle battery. A fuse 64 can be incorporated in the lead 62 for the usual well known purpose, and it will be further understood that the lead 62 can, in being directed to the vehicle battery, be extended through the ignition switch of the vehicle so as to insure completely against accidental illumination of the fog lamps when the vehicle is not in use.

The switch 58 is so arranged as to cause a circuit to be closed to the lamp units 28, when the lamp units are swung away from the lens shields 56 to their operative positions. As a result, the lamp units are automatically illuminated when they are lowered to their operative positions. Conversely, when the lamp units are swung to their inoperative positions, they are automatically turned "off," by opening of the circuit thereto.

It may be noted that although a manually operable, mechanical means has been illustrated for rotating the rock shaft 20 in opposite directions, an electrical means could be used as well, if desired. Thus, I believe that quite possibly, an electric motor of the reversible type could be associated with the rock shaft, having an operative, geared driving connection to the rock shaft for rotating the rock shaft in opposite directions, said electric motor to be controlled by a button or switch mounted within the vehicle and accessible to the vehicle operator.

Further, it is considered to be an important characteristic of the invention that the device can be manufactured for automobiles of various sizes or makes. The bearings 14 are adjustable to selected positions relative to one another, to accommodate said bearings to the particular distance between the frame members 12 of the vehicle on which the device is to be mounted. Further, the radial stop arm 42 can be adjusted to a selected position, so as to be engaged by a structural part of the particular vehicle on which the device is mounted. Still further, adjustments can be made in the cable 32, and in the angle at which the stop arm 42 is disposed relative to the fog lamp units 28.

Figure 2:
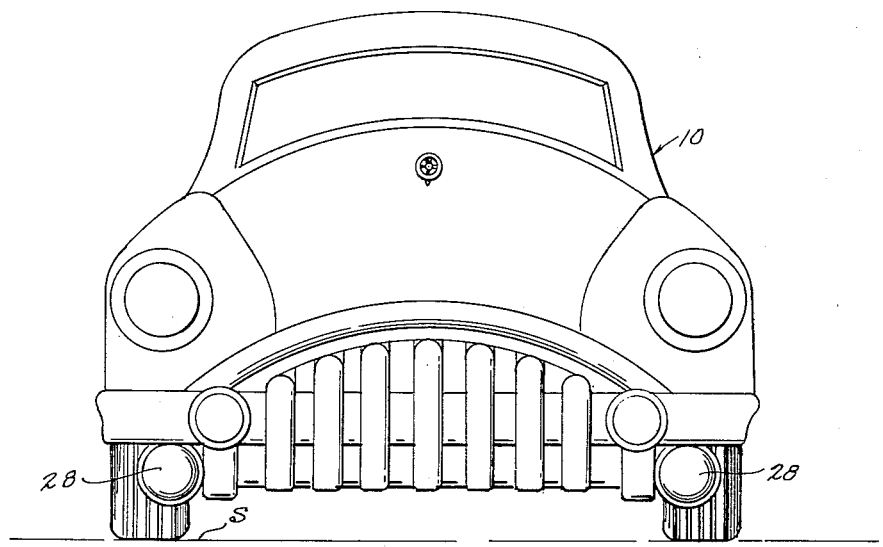
Figure 2 is a front elevational view of the automobile and of the fog light assembly carried thereby.

A retractable fog lamp assembly formed in accordance with the present invention is adapted to permit the lamps to be lowered to a minimum elevation above a road surface S (see Figure 2), at which elevation they will project their beams below the fog, unless, of course, the fog extends fully to the road surface. This arrangement, wherein the beams of the fog lamps reach out below the fog, rather than through the fog, aids measurably in respect to providing visibility for the vehicle operator.

Still further, it is considered to be an important feature of the invention that the lens shields will ordinarily protect the lenses of the fog lamps from mud, dirt, rocks, or any other foreign material which might have a tendency to soil or damage them in any way. At the same time, the lens shields are adapted to provide supports for circuit breaking means, with said circuit breaking means being actuated by the lamp units themselves, so as to illuminate or turn "off" the lamp units, responsive to shifting of the lamp units to their operative and inoperative positions respectively.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a retractable lamp assembly for an automotive vehicle the combination, with a transversely extending bumper of said vehicle and with a pair of longitudinal frame members of the vehicles spaced transversely of the bumper, of coaxial bearings secured to the undersides of the respective members; a rock shaft journaled intermediate its ends in said bearings and extending transversely of the members in closely spaced, substantially parallel relation to the bumper; lamp units suspended from and fixedly secured to the respective ends of the rock shaft and spaced radially and outwardly from the rock shaft a distance sufficient to dispose the axis of rocking movement of the shaft wholly without the units, the shaft rotating in opposite directions between a first position in which the units are operatively disposed below and in substantially vertically spaced relation to the shaft, and a second position in which said units are swung through ninety degrees from their operative position to an inoperative position in which they are spaced substantially horizontally from and are disposed between the bumper and rock shaft; protective lens shields secured to said bumper and disposed laterally of the bumper in the space between the bumper and rock shaft at locations effective to cause the shields to protectively cover the lenses of the units while limiting movements of the units beyond their inoperative positions; a radial arm carried by and rotatable with the rock shaft; and abutment means extending laterally from one of the bearings in the path of said arm, said abutment means engaging the arm on rotation of the rock shaft to the first position thereof, to limit movement of the units beyond their operative positions.

2. In a retractable lamp assembly for an automotive vehicle the combination, with a transversely extending bumper of said vehicle and with a pair of longitudinal frame members of the vehicle spaced transversely of the bumper, of coaxial bearings secured to the undersides of the respective members; a rock shaft journaled intermediate its ends in said bearings and extending transversely of the members in closely spaced, substantially parallel relation to the bumper; lamp units suspended from and fixedly secured to the respective ends of the rock shaft and spaced radially and outwardly from the rock shaft a distance sufficient to dispose the axis of rocking movement of the shaft wholly without the units, the shaft rotating in opposite directions between a first position in which the units are operatively disposed below and in substantially vertically spaced relation to the shaft, and a second position in which said units are swung through ninety degrees from their operative position to an inoperative position in which they are spaced substantially horizontally from and are disposed between the bumper and rock shaft; protective lens shields secured to said bumper and disposed laterally of the bumper in the space between the bumper and rock shaft at locations effective to cause the shields to protectively cover the lenses of the units while limiting movements of the units beyond their inoperative positions; a radial arm carried by and rotatable with the rock shaft; and abutment means extending laterally from one of the bearings in the path of said arm, said abutment means engaging the arm on rotation of the rock shaft to the first position thereof, to limit movement of the units beyond their operative positions, said arm being connected to the rock shaft for rotatable adjustment about the axis of the rock shaft to selected locations in respect to said abutment means, and being fixedly attachable to the arm in each of said selected positions, for adjustably controlling the extended travel of the lamp units between the operative and inoperative positions thereof, and for selectively locating said lamp units in their operative positions.

References Cited in the file of this patent

UNITED STATES PATENTS

| | | |
|---|---|---|
| 1,395,147 | Rutherford | Oct. 25, 1921 |
| 2,244,535 | Grimes | June 3, 1941 |
| 2,510,818 | Grimes | June 6, 1950 |
| 2,662,605 | Riggs | Dec. 15, 1953 |